(12) United States Patent
Jeon

(10) Patent No.: US 11,645,802 B2
(45) Date of Patent: May 9, 2023

(54) METHOD, SYSTEM, AND NON-TRANSITORY COMPUTER-READABLE RECORDING MEDIUM FOR GENERATING ANIMATION SEQUENCE

(71) Applicant: ANIPEN CO., LTD., Seongnam-si (KR)

(72) Inventor: Jae Woong Jeon, Seoul (KR)

(73) Assignee: ANIPEN CO., LTD., Seongnam-si (KR)

( * ) Notice: Subject to any disclaimer, the term of this patent is extended or adjusted under 35 U.S.C. 154(b) by 0 days.

(21) Appl. No.: 17/416,146

(22) PCT Filed: Dec. 19, 2019

(86) PCT No.: PCT/KR2019/018138
§ 371 (c)(1),
(2) Date: Jun. 18, 2021

(87) PCT Pub. No.: WO2020/130692
PCT Pub. Date: Jun. 25, 2020

(65) Prior Publication Data
US 2022/0076473 A1 Mar. 10, 2022

(30) Foreign Application Priority Data
Dec. 19, 2018 (KR) .................. 10-2018-0165686

(51) Int. Cl.
*G06T 19/00* (2011.01)
*G06T 13/40* (2011.01)
*G06T 7/70* (2017.01)
*G06T 15/20* (2011.01)
*G06T 19/20* (2011.01)

(52) U.S. Cl.
CPC ............. *G06T 13/40* (2013.01); *G06T 7/70* (2017.01); *G06T 15/205* (2013.01); *G06T 19/006* (2013.01); *G06T 19/20* (2013.01); *G06T 2200/24* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 2016/0343163 A1 | 11/2016 | Venkatesha et al. | |
| 2018/0357829 A1* | 12/2018 | Kaino | H04N 7/183 |
| 2019/0004639 A1* | 1/2019 | Faulkner | G06F 3/048 |

FOREIGN PATENT DOCUMENTS

| | | |
|---|---|---|
| JP | 2009169471 A | 7/2009 |
| JP | 2013092964 A | 5/2013 |

(Continued)

OTHER PUBLICATIONS

International Search Report of PCT/KR2019/018138 dated Apr. 3, 2020.

*Primary Examiner* — Nicholas R Wilson
(74) *Attorney, Agent, or Firm* — Dinsmore & Shohl LLP; Yongsok Choi, Esq.

(57) ABSTRACT

A method for generating an animation sequence is provided. The method includes the steps of: determining attribute information on at least one of a motion and an effect of a target object on the basis of change information on at least one of a position and a posture of a camera; and generating an animation sequence of the target object with reference to the determined attribute information.

15 Claims, 5 Drawing Sheets

(56) References Cited

FOREIGN PATENT DOCUMENTS

| JP | 2016509722 | A | 3/2016 |
|----|------------|---|--------|
| KR | 1020150013709 | A | 2/2015 |
| KR | 101575092 | B1 | 12/2015 |
| KR | 1020160103897 | A | 9/2016 |
| KR | 1020170067673 | A | 6/2017 |
| KR | 101910931 | B1 | 10/2018 |

\* cited by examiner

METHOD, SYSTEM, AND NON-TRANSITORY COMPUTER-READABLE RECORDING MEDIUM FOR GENERATING ANIMATION SEQUENCE

CROSS-REFERENCE TO RELATED APPLICATION(S)

This application is a national phase of Patent Cooperation Treaty (PCT) International Application No. PCT/KR2019/018138 filed on Dec. 19, 2019, which claims priority to Korean Patent Application No. 10-2018-0165686 filed on Dec. 19, 2018. The entire contents of PCT International Application No. PCT/KR2019/018138 and Korean Patent Application No. 10-2018-0165686 are hereby incorporated by reference.

FIELD OF THE INVENTION

The present invention relates to a method, system, and non-transitory computer-readable recording medium for generating an animation sequence.

BACKGROUND

In recent years, there is an increasing demand for contents that can be represented in three dimensions even on a two-dimensional screen of a digital device such as a personal computer or a mobile terminal device. Further, as one-person broadcasting platforms, content creator platforms, and the like are vitalized, there are a growing number of general users who intend to personally author and use three-dimensional (3D) contents.

Content authoring tools have been conventionally employed in authoring such 3D contents. However, it is complicated and difficult to use conventional animation authoring tools, and thus only trained experts can use the tools in general.

In this connection, the inventor(s) present a technique for allowing even non-experts to easily author 3D animations on the basis of change information on at least one of a position and a posture of a camera.

SUMMARY OF THE INVENTION

One object of the present invention is to solve all the above-described problems. Another object of the invention is to acquire a target object from a content photographed by a camera or a source content, and easily generate an animation of the target object in association with change information on at least one of a position and a posture of the camera.

Yet another object of the invention is to assist even non-experts to easily author 3D contents.

The representative configurations of the invention to achieve the above objects are described below.

According to one aspect of the invention, there is provided a method for generating an animation sequence, comprising the steps of: determining attribute information on at least one of a motion and an effect of a target object on the basis of change information on at least one of a position and a posture of a camera; and generating an animation sequence of the target object with reference to the determined attribute information.

According to another aspect of the invention, there is provided a system for generating an animation sequence, comprising: an attribute information determination unit configured to determine attribute information on at least one of a motion and an effect of a target object on the basis of change information on at least one of a position and a posture of a camera; and an animation sequence generation unit configured to generate an animation sequence of the target object with reference to the determined attribute information.

In addition, there are further provided other methods and systems to implement the invention, as well as non-transitory computer-readable recording media having stored thereon computer programs for executing the methods.

According to the invention, it is possible to acquire a target object from a content photographed by a camera or a source content, and easily generate an animation of the target object in association with change information on at least one of a position and a posture of the camera.

According to the invention, it is possible to assist even non-experts to easily author 3D contents.

DETAILED DESCRIPTION

Figure 1:
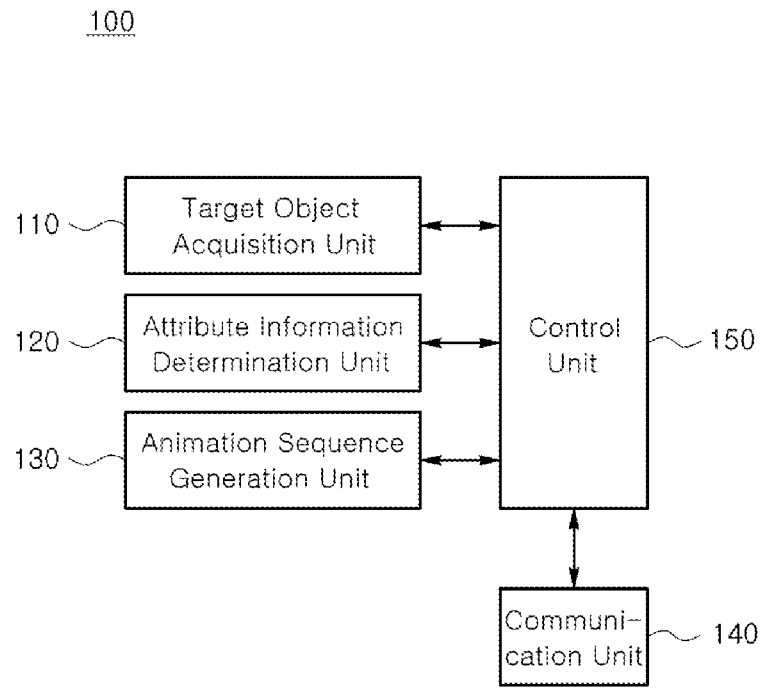
FIG. 1 illustratively shows the internal configuration of an authoring system according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Herein, the term "content" or "contents" encompasses digital information or individual information elements comprised of text, symbol, speech, sound, image, video, and the like. For example, such contents may comprise data such as text, image, video, audio, and links (e.g., web links) or a combination of at least two types of such data.

Hereinafter, various preferred embodiments of the present invention will be described in detail with reference to the accompanying drawings to enable those skilled in the art to easily implement the invention.

Configuration of an Authoring System

Hereinafter, the functions of the respective components of an authoring system 100 crucial for implementing the invention will be discussed.

FIG. 1 illustratively shows the internal configuration of the authoring system 100 according to one embodiment of the invention.

The authoring system 100 according to one embodiment of the invention may comprise a target object acquisition unit 110, an attribute information determination unit 120, an animation sequence generation unit 130, a communication unit 140, and a control unit 150. According to one embodiment of the invention, at least some of the target object acquisition unit 110, the attribute information determination unit 120, the animation sequence generation unit 130, the communication unit 140, and the control unit 150 may be program modules to communicate with an external system. The program modules may be included in the authoring system 100 in the form of operating systems, application program modules, and other program modules, while they may be physically stored in a variety of commonly known storage devices. Further, the program modules may also be stored in a remote storage device that may communicate with the authoring system 100. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the authoring system 100 has been described as above, and it will be apparent to those skilled in the art that at least a part of the components or functions of the authoring system 100 may be implemented or included in a server system (not shown) or a device 400 held, carried, or worn by a user, as necessary. Further, in some cases, all of the functions and components of the authoring system 100 may be implemented or included in the server system or the device 400.

The device 400 according to one embodiment of the invention is a digital device having a memory means and a microprocessor for computing capabilities, and may be a wearable device such as smart glasses, a smart watch, a smart band, a smart ring, a smart necklace, a smart earset, smart earphones, and smart earrings, or may be a somewhat traditional device such as a smart phone, a smart pad, a desktop computer, a notebook computer, a workstation, a personal digital assistant (PDA), a web pad, a mobile phone, and a remote controller. The device 400 is not limited only to the above examples, and may be changed without limitation as long as the objects of the invention may be achieved. Further, the device 400 according to one embodiment of the invention may include a camera for acquiring text, image, or video contents, a sensor for measuring change information on a position and a posture of the camera (e.g., a speed sensor, an acceleration sensor, or a GPS sensor), or a display means for displaying animations (e.g., a display).

Meanwhile, the device 400 according to one embodiment of the invention may include an application for supporting animation sequence generation according to the invention. The application may be downloaded from an external application distribution server (not shown). The characteristics of the application may be generally similar to those of the target object acquisition unit 110, the attribute information determination unit 120, the animation sequence generation unit 130, the communication unit 140, and the control unit 150 of the authoring system 100 to be described below. Here, at least a part of the application may be replaced with a hardware device or a firmware device that may perform a substantially equal or equivalent function, as necessary.

First, the target object acquisition unit 110 according to one embodiment of the invention may function to acquire a target object with reference to at least one of a content photographed by a camera and a source content. The target object according to one embodiment of the invention should be interpreted in the broadest sense as including not only an object such as a thing or a living organism whose shape or form can be clearly specified, but also an object such as an area or a space (e.g., a background) whose shape or form cannot be clearly specified.

For example, the target object acquisition unit 110 may acquire at least one of a plurality of real-world objects acquired in a video or image photographed by the camera or a source video or image as the target object.

More specifically, when an image of a plurality of real-world objects including a doll is photographed by the camera, the target object acquisition unit 110 may generate a virtual object (which may be a two-dimensional or three-dimensional object) from the doll in the photographed image, and may acquire the virtual object as the target object according to the invention. According to one embodiment of the invention, the shape or color of the virtual object may be identical or similar to the shape or color of the doll that is a real-world object. Further, when an image of a plurality of real-world objects including a sky (e.g., containing clouds) is photographed by the camera, the target object acquisition unit 110 may generate a virtual object (which may be a two-dimensional or three-dimensional object) from the sky (e.g. containing clouds) in the photographed image, and may acquire the virtual object as the target object according to the invention. Meanwhile, the target object acquisition unit 110 according to one embodiment of the invention may utilize known 3D scanning, modeling, or rendering techniques in the process of acquiring the target object.

As another example, the target object acquisition unit 110 may refer to an image stored in the authoring system 100 (or the device 400) or provided from an external system (not shown) as a source content to acquire the target object.

Next, the attribute information determination unit 120 according to one embodiment of the invention may determine attribute information on at least one of a motion and an effect of the target object on the basis of change information on at least one of a position and a posture of the camera. According to one embodiment of the invention, the change information on the position of the camera may be specified on the basis of absolute coordinates (e.g., geographic coordinates such as GPS coordinates) or relative coordinates (e.g., coordinates at which the camera is located with respect to a point specified by the camera) of the camera, and may include, for example, at least one of a travel distance, a travel direction, a travel speed, and an acceleration of the camera. Further, the change information on the posture of the camera may include information on at least one of a tilt, an angular velocity, and an angular acceleration of the camera. In addition, the attribute information on the motion of the target object may include information on at least one moving part (e.g., a hand, head, foot, or the like) of the target object, a direction in which the part moves, an extent to which the part moves (e.g., a distance, speed, acceleration, angular velocity, angular acceleration, or tilting time of the movement), and the like, and the attribute information on the effect of the target object may include information on an area (or part) where the effect is to be made, a kind of the effect (e.g., rain, snow, or lightning), a sensory type of the effect (e.g., visual, tactile, or aural), an extent to which the effect is made (e.g., duration of the effect), and the like.

For example, when the target object is a doll composed of a head and a body, and the change information on the position and posture of the camera indicates that the camera is panned while repeatedly moving left and right around the doll with a predetermined angle and a predetermined speed, the attribute information determination unit 120 may determine the doll's head as a part where a motion is to be made in correspondence to the change information, and may determine the attribute information on the motion of the target object to indicate that the doll's head moves left and right according to the change information (specifically, the panning angle and panning speed of the camera).

As another example, when the target object is a robot composed of a head, a body, arms, and legs, and the change information on the position and posture of the camera indicates that the camera moves with acceleration in a specific direction, the attribute information determination unit 120 may determine the attribute information on the motion of the target object to indicate that the robot runs with acceleration in the specific direction (and also indicate that the robot's arms and legs move back and forth) in correspondence to the change information.

As yet another example, when the target object is a robot composed of a head, body, arms, and legs, and the change information on the position and posture of the camera indicates that the camera moves from left to right with respect to a predetermined point (or the coordinates of the camera's position are changed from (x1, y1, z1) to (x2, y2, z2)) at a predetermined constant speed, the attribute information determination unit 120 may determine the attribute information on the motion of the target object to indicate that the robot walks from the coordinates corresponding to the left to the coordinates corresponding to the right (or from (x1, y1, z1) to (x2, y2, z2)). Meanwhile, the coordinates according to one embodiment of the invention may be specified in a reference coordinate system (or a reference plane) defined around a predetermined point (or area) photographed by the authoring system 100 according to the invention, the device 400, or the camera.

As still another example, when the target object is a sky and the change information on the position and posture of the camera indicates that the camera is repeatedly tilted up and down at a predetermined angle, the attribute information determination unit 120 may determine an area containing the target object as an area where the effect is to be made, and may determine the attribute information on the effect of the target object to indicate that rain or snow falls in the area in correspondence to the change information (specifically, the tilting speed of the camera).

Meanwhile, the attribute information determination unit 120 may determine the attribute information on at least one of the motion and effect of the target object with reference to a database or a lookup table for the attribute information on the motion and effect of the target object associated with the change information. The database or lookup table may be predefined or dynamically updated.

Further, the attribute information determination unit 120 may determine the attribute information on at least one of the motion and effect of the target object with reference to situation information associated with a location of the camera (e.g., local weather or a topic related to the location).

For example, when weather in a region where the camera is located is snowy or raining, the attribute information determination unit 120 may determine the attribute information on the motion and effect of the target object to be associated with snow or rain. More specifically, the attribute information on the motion and effect of the target object may be determined to indicate that the target object holds an umbrella and snow or rain falls around the target object.

As another example, when a place where the camera is located is a skating rink, the attribute information determination unit 120 may determine the attribute information on the motion and effect of the target object to be associated with skating. More specifically, the attribute information on the motion and effect of the target object may be determined to indicate that the target object moves or runs wearing skates and snow falls around the target object.

Meanwhile, the attribute information determination unit 120 may determine the attribute information on at least one of the motion and effect of the target object on the further basis of input operation information generated by a user associated with the change information.

For example, when the user associated with the change information makes a button (or touch) input to a device (e.g., a smart phone) including the camera, the attribute information on at least one of the motion and effect of the target object may be determined in correspondence to the button input.

Next, the animation sequence generation unit according to one embodiment of the invention may generate an animation sequence of the target object with reference to the attribute information determined by the attribute information determination unit 120.

For example, the animation sequence generation unit 130 may generate the animation sequence of the target object by matching the attribute information on the motion and effect determined by the attribute information determination unit 120 to a time sequence associated with the camera. The time sequence according to one embodiment of the invention may include at least one pod that is a point (or time point) to which the attribute information on the motion and effect determined by the attribute information determination unit 120 is matched.

Further, the animation sequence generation unit 130 may generate an animation of the target object by rendering the animation sequence of the target object.

For example, the animation sequence generation unit 130 may generate an augmented reality (AR) video by combining and rendering the animation sequence of the target object and a real-world video or a mixed reality video photographed by the camera.

More specifically, the animation sequence generation unit 130 may track the coordinates of a real-world video photographed by the camera and extract 3D mapping coordinates therefrom, using simultaneous localization and mapping (SLAM) techniques, and may determine coordinates at which the animation sequence of the target object is to be displayed in the real-world video, with reference to information on the tracked coordinates of the real-world video and the extracted 3D mapping coordinates, and generate an augmented reality video by combining the animation sequence of the target object and the real-world video with respect to the determined coordinates.

As another example, the animation sequence generation unit 130 may generate an animation of the target object by combining and rendering the animation sequence of the target object and a virtual reality video.

Next, the communication unit 140 according to one embodiment of the invention may function to enable data transmission/reception from/to the target object acquisition unit 110, the attribute information determination unit 120, and the animation sequence generation unit 130.

Lastly, the control unit 150 according to one embodiment of the invention may function to control data flow among the target object acquisition unit 110, the attribute information determination unit 120, the animation sequence generation unit 130, and the communication unit 140. That is, the control unit 150 according to the invention may control data flow into/out of the authoring system 100 or data flow among the respective components of the authoring system 100, such that the target object acquisition unit 110, the attribute information determination unit 120, the animation sequence generation unit 130, and the communication unit 140 may carry out their particular functions, respectively.

First Embodiment

Figure 2:
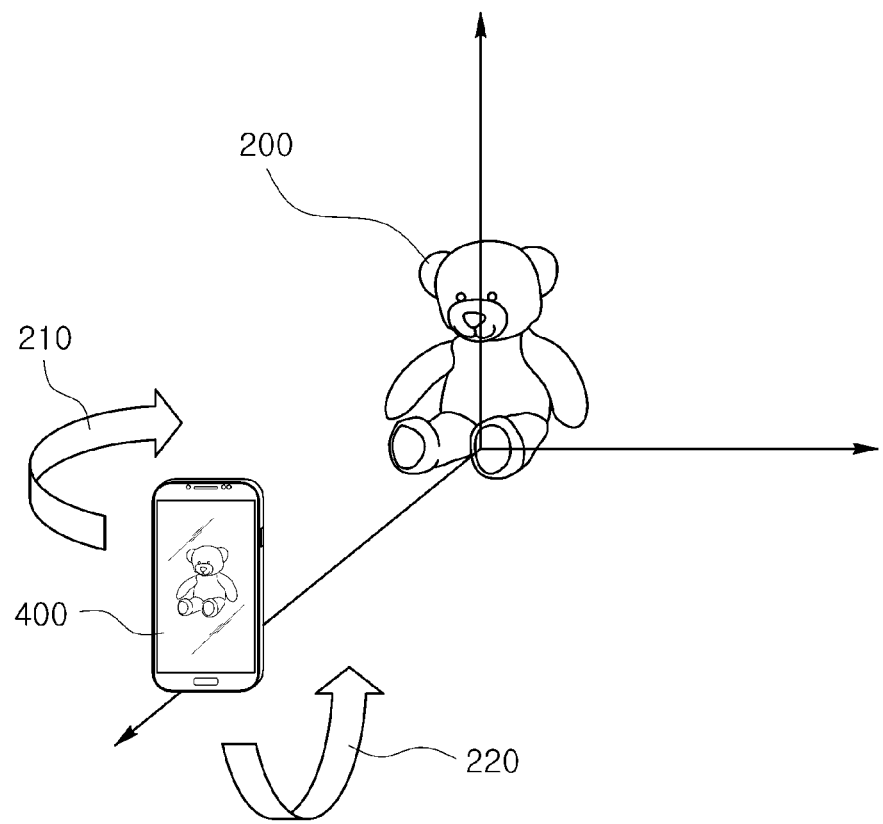
FIG. 2 shows how an animation sequence is generated according to one embodiment of the invention.
Figure 3:
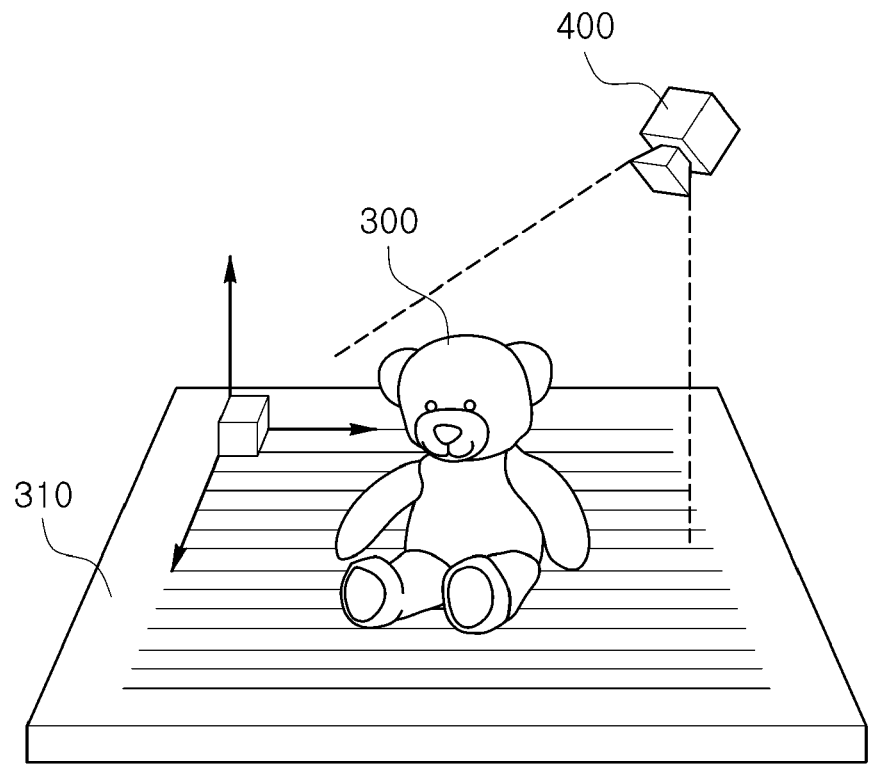
FIG. 3 shows how an animation sequence is generated according to one embodiment of the invention.
Figure 4:
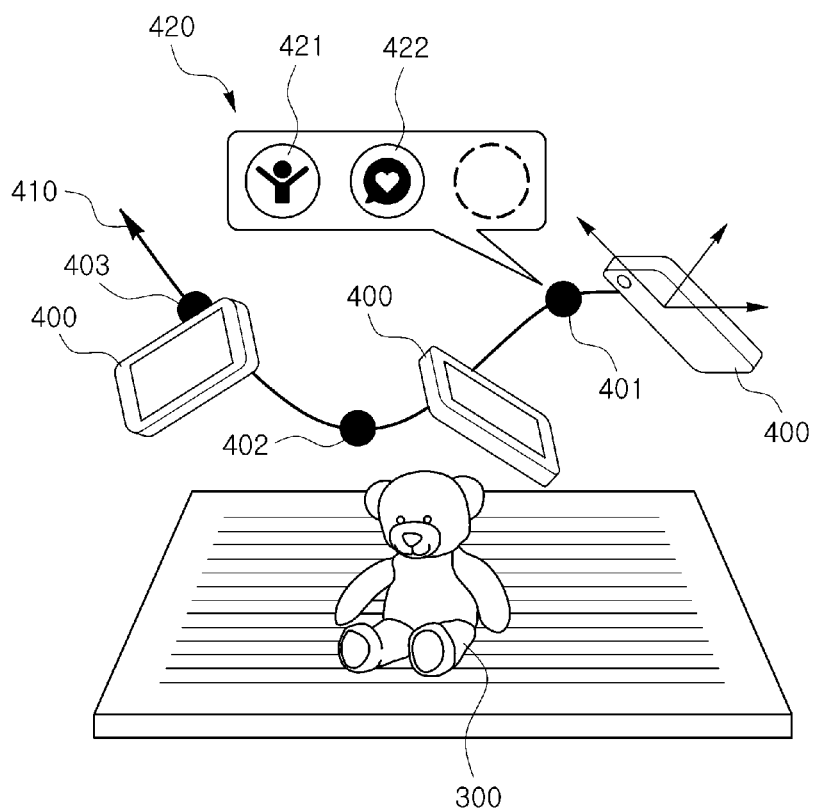
FIG. 4 shows how an animation sequence is generated according to one embodiment of the invention.

FIGS. 2 to 4 illustratively show how an animation sequence is generated according to one embodiment of the invention.

Referring to FIGS. 2 to 4, it may be assumed that the authoring system 100 according to one embodiment of the invention is included in a smart phone 400 (i.e., the device 400 according to the invention).

First, a target object 300 may be acquired on the basis of a content (e.g., an image) photographed by a camera of the smart phone 400.

For example, referring to FIG. 2, an image containing a real-world object 200 may be photographed by the camera of the smart phone 400 (210, 220), and the target object 300 may be acquired on the basis of the photographed image. In this case, the photographing may be performed such that the camera is rotated left and right 210 or up and down 220 around the real-world object 200, in order to perform 3D scanning of the real-world object 200.

Next, the acquired target object 300 may be virtually generated in a video that is being photographed by the camera of the smart phone 400.

For example, referring to FIG. 3, the acquired target object 300 may be virtually arranged in a background 310 that is being photographed by the camera of the smart phone 400.

Next, attribute information on at least one of a motion and an effect of the target object 300 may be determined on the basis of change information on at least one of a position and a posture of the camera of the smart phone 400.

For example, referring to FIG. 4, when the camera of the smart phone 400 moves along a path 410 around the target object 300, the attribute information on the motion and effect of the target object 300 corresponding to the change information may be matched to at least one pod 401, 402, 403 that is specified in a time sequence associated with the camera for every predetermined period (or every time a predetermined event occurs (e.g., every time the motion of the camera is changed at or above a predetermined level)).

More specifically, at a first pod 401, when the change information indicates that the camera shakes several times while moving from right to left, the attribute information on the motion of the target object 300 may be determined to indicate that the target object 300 walks waving its hand from right to left. Further, at a second pod 402, when the change information indicates that the camera moves closer to the target object 300, the attribute information on the effect of the target object 300 may be determined to indicate that a flame effect is visually or aurally generated around the target object 300. In addition, at a third pod 403, when the change information indicates that the camera moves away from the target object 300 at a speed of 2 m/s or higher, the attribute information on the motion and effect of the target object 300 may be determined to indicate that the target object 300 runs backward as a lightning effect is visually or aurally generated around the target object 300.

Next, an animation sequence of the target object may be generated on the basis of the determined attribute information on the motion and effect.

Meanwhile, the authoring system 100 may provide a graphical user interface (GUI) for supporting at least one of addition, modification, and deletion of at least one motion or at least one effect for the animation sequence of the target object.

For example, the addition, modification, and deletion of at least one motion or at least one effect may be supported such that they are performed with respect to the above-described pods 401, 402, and 403 or predetermined pods 420 and 421 (specifically, the pods predetermined earlier than the pods 401, 402, and 403).

Figure 5:
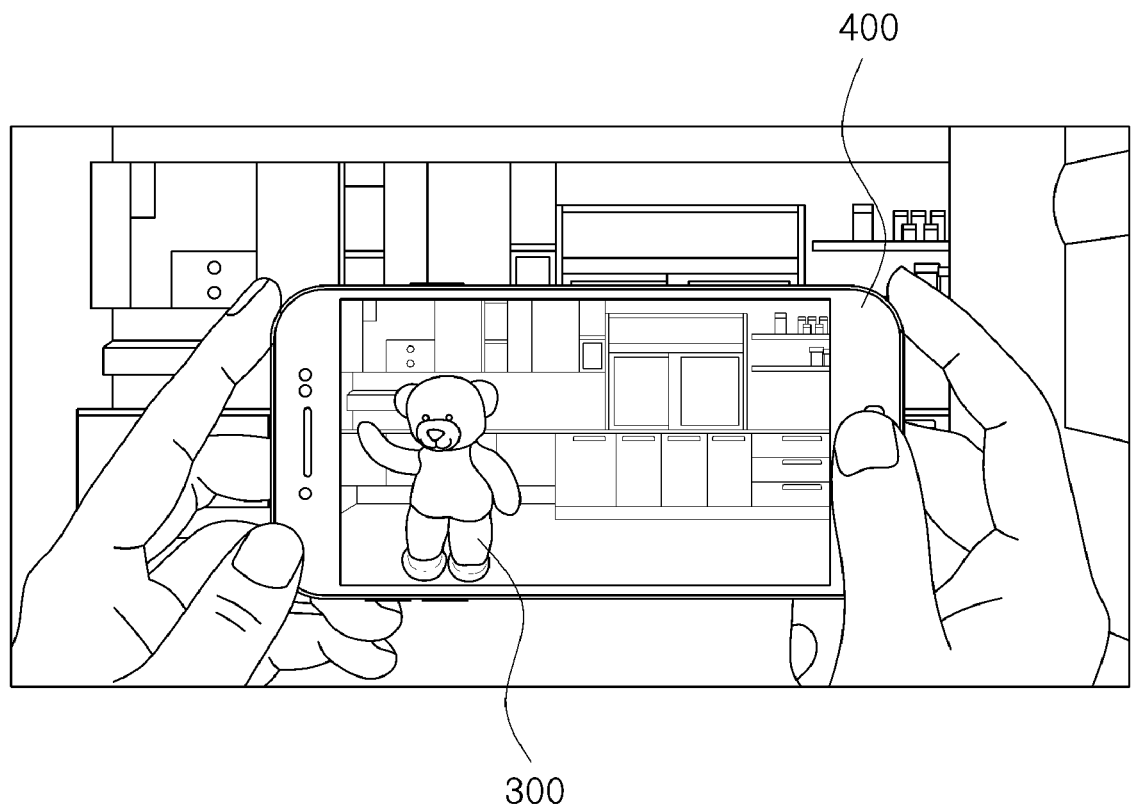
FIG. 5 shows how an animation sequence is generated according to one embodiment of the invention.

FIG. 5 illustratively shows a screen in which an animation sequence generated according to one embodiment of the invention is implemented in a real-world background.

Referring to FIG. 5, according to one embodiment of the invention, the target object 300 may be augmented and arranged in a place photographed by the camera of the smart phone 400 (i.e., a kitchen), and an augmented reality video may be generated in which a flame effect is visually or aurally generated around the target object 300 after the target object 300 walks waving its hand from right to left in the kitchen, and the target object 300 runs backward (i.e., toward a sink) as a lightning effect is visually or aurally generated around the target object 300.

Second Embodiment

Figure 6:
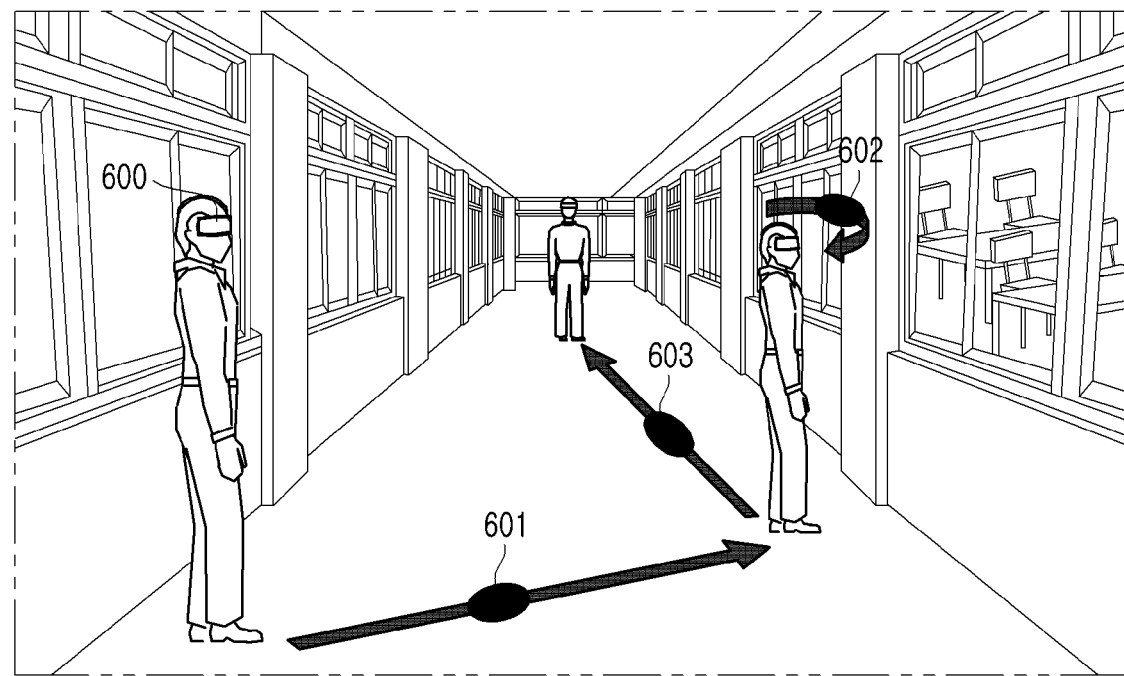
FIG. 6 shows how an animation sequence is generated according to another embodiment of the invention.

FIG. 6 illustratively shows how an animation sequence is generated according to another embodiment of the invention.

Referring to FIG. 6, it may be assumed that the authoring system 100 according to one embodiment of the invention is included in a head-mounted display (HMD) 600 (i.e., the device 400 according to the invention). The head-mounted display 600 may include a camera and may have some properties of Google Glass by Google, Epiphany Eyewear by Vergence Labs, M100 Glasses by Vuzix, and the like, for example.

First, a target object (e.g., a tiger 701 in FIG. 7) may be acquired on the basis of a source content (e.g., an image) stored in the head-mounted display 600.

Next, attribute information on at least one of a motion and an effect of the target object 701 may be determined on the basis of change information on at least one of a position and a posture of the camera of the head-mounted display 600.

For example, when the camera of the head-mounted display 600 moves along a path (e.g. along the arrows), the attribute information on the motion and effect of the target object corresponding to the change information may be matched to at least one pod 601, 602, 603 that is specified in a time sequence associated with the camera for every predetermined period (or every time a predetermined event occurs (e.g., every time the motion of the camera is changed at or above a predetermined level)).

More specifically, at a first pod 601, when the change information indicates that the camera moves with acceleration from an outdoor window of a hallway (i.e., the left window in the image) to an indoor window of the hallway (i.e., the right window in the image), the attribute information on the motion of the target object 701 may be determined to indicate that the target object 701 runs with acceleration from the coordinates corresponding to the outdoor window of the hallway to the coordinates corresponding to the indoor window of the hallway. Further, at a second pod 602, when the change information indicates that the camera is rotated left and right, the attribute information on the motion of the target object 701 may be determined to indicate that the target object 701 looks around rotating its head left and right. In addition, at a third pod 603, when the change information indicates that the camera moves from the indoor window of the hallway to the end of the hallway at a constant speed, the attribute information on the motion of the target object 701 may be determined to indicate that the target object 701 walks swinging its arms from the coordinates corresponding to the indoor window of the hallway to the coordinates corresponding to the end of the hallway at a constant speed.

Next, an animation sequence of the target object 701 may be generated on the basis of the determined attribute information on the motion and effect.

Next, an augmented reality (AR) video may be generated by combining the animation sequence of the target object 701 and a real-world video photographed by the camera. Meanwhile, a virtual reality video or a mixed reality video may be generated by combining the animation sequence of the target object 701 and a video implemented on the head-mounted display 600.

Figure 7:
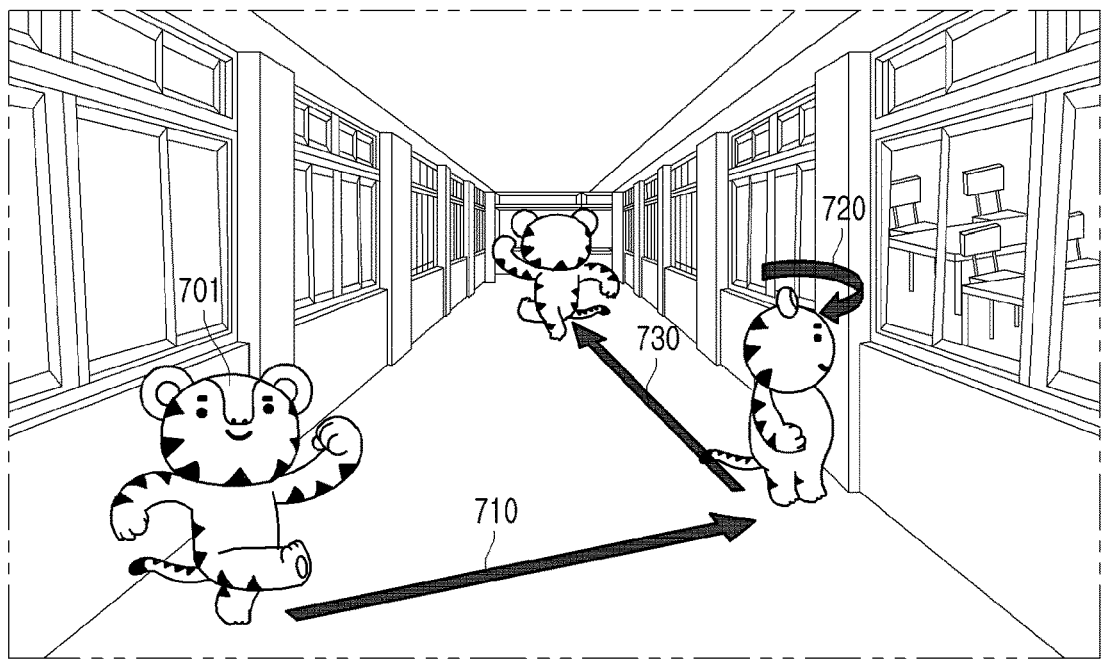
FIG. 7 shows how an animation sequence is generated according to another embodiment of the invention.

FIG. 7 illustratively shows a screen in which an animation sequence generated according to another embodiment of the invention is implemented in a real-world background.

Referring to FIG. 7, according to one embodiment of the invention, the target object 701 may be augmented and arranged around the place photographed by the camera of the head-mounted display 600 (i.e., hallway), and an augmented reality video may be generated in which the target object 701 runs with acceleration from the outdoor window of the hallway to the indoor window of the hallway, looks around turning its head at the indoor window of the hallway, and walks swinging its arms from the indoor window of the hallway to the end of the hallway at a constant speed.

Third Embodiment

Figure 8:
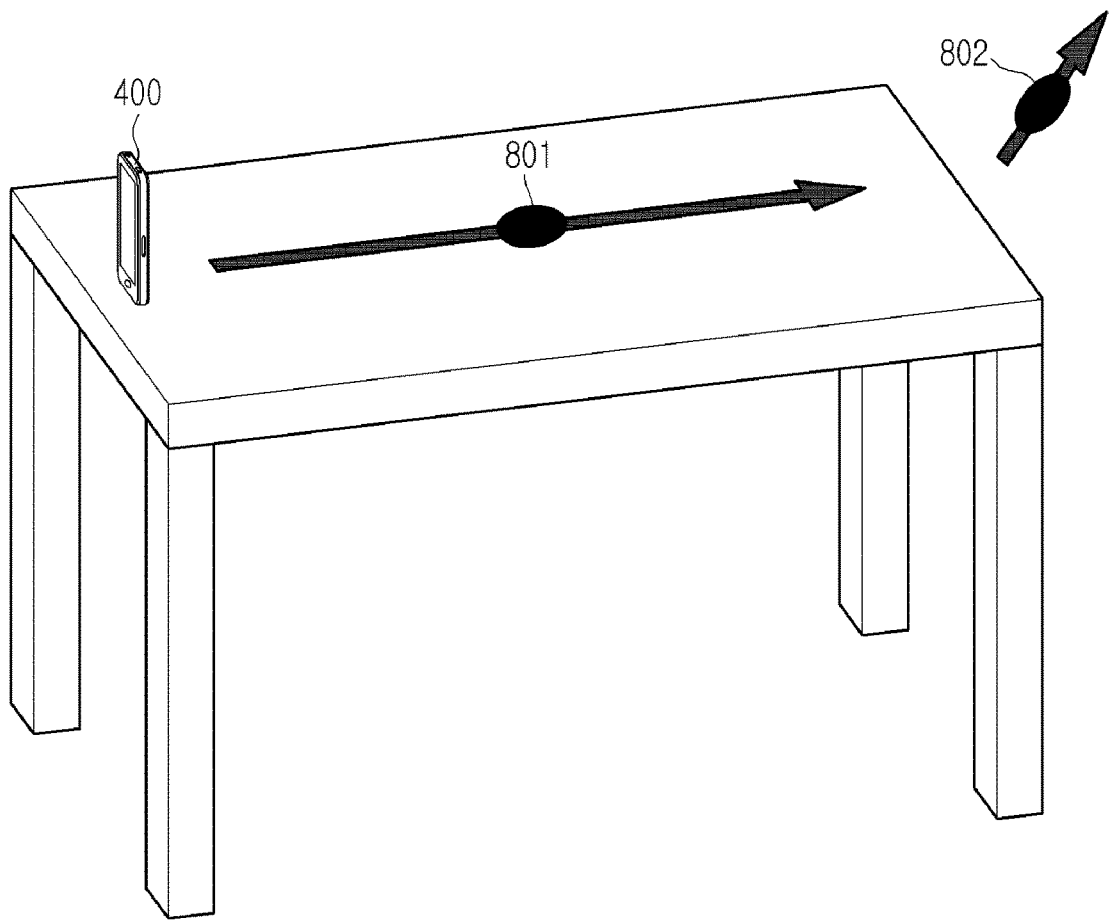
FIG. 8 shows how an animation sequence is generated according to yet another embodiment of the invention.

FIG. 8 illustratively shows how an animation sequence is generated according to yet another embodiment of the invention.

Referring to FIG. 8, it may be assumed that the authoring system 100 according to one embodiment of the invention is included in the smart phone 400 (i.e., the device 400 according to the invention).

First, a target object (e.g., an Iron Man character 901 in FIG. 9) may be acquired on the basis of a source content (e.g., a video or an image) stored in the smart phone 400.

Next, attribute information on at least one of a motion and an effect of the target object 901 may be determined on the basis of change information on at least one of a position and a posture of the camera of the smart phone 400.

For example, when the camera of the smart phone 400 moves along a path (e.g., along the arrows), the attribute information on the motion and effect of the target object corresponding to the change information may be matched to at least one pod 801, 802 that is specified in a time sequence associated with the camera for every predetermined period (or every time a predetermined event occurs (e.g., every time the motion of the camera is changed at or above a predetermined level)).

More specifically, at a first pod 801, when the change information indicates that the camera moves with deceleration from the left to the right of the desk in a parallel direction, the attribute information on the motion of the target object 901 may be determined to indicate that the target object 901 runs with deceleration from the coordinates corresponding to the left of the desk to the coordinates corresponding to the right of the desk. Further, at a second pod 802, when the change information indicates that the camera moves with acceleration upward by a predetermined angle from the parallel direction, the attribute information on the motion and effect of the target object 901 may be determined to indicate that a lightning effect is generated around the target object 901 as the target object 901 flies upward by a predetermined angle from the parallel direction.

Next, an animation sequence of the target object 901 may be generated on the basis of the determined attribute information on the motion and effect.

Next, an augmented reality (AR) video may be generated by combining the animation sequence of the target object 901 and a real-world video photographed by the camera.

Figure 9:
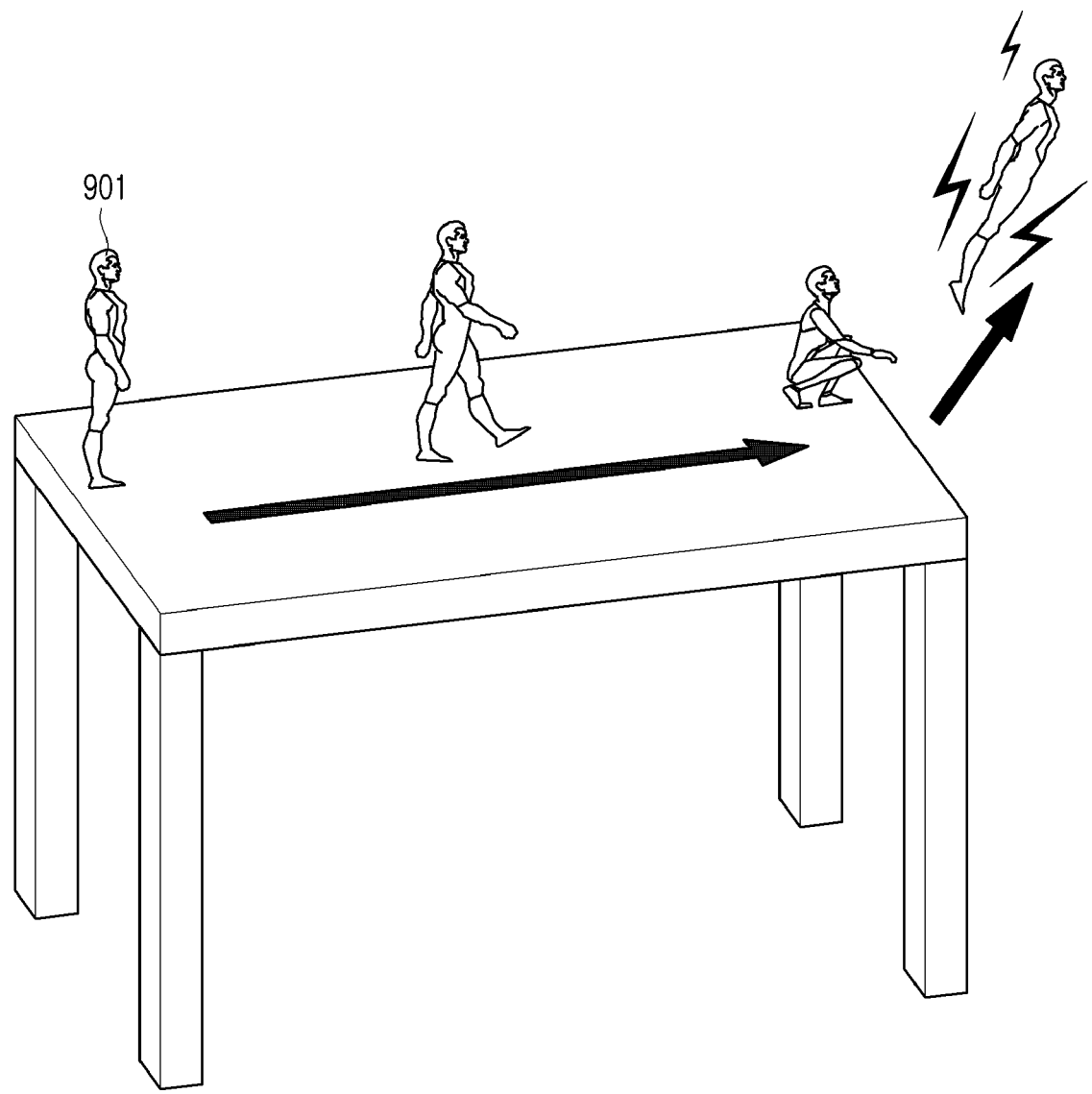
FIG. 9 shows how an animation sequence is generated according to yet another embodiment of the invention.

FIG. 9 illustratively shows a screen in which an animation sequence generated according to yet another embodiment of the invention is implemented in a real-world background.

Referring to FIG. 9, according to yet another embodiment of the invention, the target object 901 may be augmented and arranged around the place photographed by the camera of the smart phone 400 (i.e., desktop), and an augmented reality video may be generated in which the target object 901 runs with deceleration from the left to the right of the desk, and a lightning effect is generated as the target object 901 flies upward at a predetermined angle from the parallel direction.

Although the cases in which the target object is a tangible object have been mainly described above, an animation sequence may be generated by the same processes as described above even when the target object is an intangible object.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for generating an animation sequence, comprising the steps of:
    determining attribute information on an effect of a target object on the basis of change information on at least one of a position and a posture of a camera, the effect of the target object being an effect related to an outside of the target object; and
    generating an animation sequence of the target object with reference to the determined attribute information on the effect of the target object,
    wherein the attribute information on the effect of the target object is configured independently of attribute information on a motion of the target object.

2. The method of claim 1, wherein the target object is acquired with reference to at least one of a content photographed by the camera and a source content.

3. The method of claim 2, wherein the target object is at least one of a plurality of objects specified in the content photographed by the camera or the source content.

4. The method of claim 1, further comprising the step of:
    generating an augmented reality (AR) video by combining the animation sequence of the target object and a real-world video photographed by the camera.

5. The method of claim 1, wherein a graphical user interface (GUI) is provided for supporting at least one of addition, modification, and deletion of at least one motion or at least one effect for the animation sequence of the target object.

6. The method of claim 1, wherein the attribute information on the effect of the target object is determined on the basis of one or more movements of the camera.

7. A non-transitory computer-readable recording medium having stored thereon a computer program for executing the method of claim 1.

8. A system for generating an animation sequence, comprising:
    an attribute information determination unit configured to determine attribute information on an effect of a target object on the basis of change information on at least one of a position and a posture of a camera, the effect of the target object being an effect related to an outside of the target object; and
    an animation sequence generation unit configured to generate an animation sequence of the target object with reference to the determined attribute information on the effect of the target object,
    wherein the attribute information on the effect of the target object is configured independently of attribute information on a motion of the target object.

9. The system of claim 8, further comprising:
    a target object acquisition unit configured to acquire the target object with reference to at least one of a content photographed by the camera and a source content.

10. The system of claim 9, wherein the target object is at least one of a plurality of objects specified in the content photographed by the camera or the source content.

11. The system of claim 8, wherein the animation sequence generation unit is configured to generate an augmented reality (AR) video by combining the animation sequence of the target object and a real-world video photographed by the camera.

12. The system of claim 8, wherein a graphical user interface (GUI) is provided for supporting at least one of addition, modification, and deletion of at least one motion or at least one effect for the animation sequence of the target object.

13. The method of claim 1, wherein the attribute information on the effect of the target object includes at least one of information on an area where the effect is to be made, information on a kind of the effect, information on a sensory type of the effect, and information on duration of the effect.

14. The system of claim 8, wherein the attribute information on the effect of the target object includes at least one of information on an area where the effect is to be made, information on a kind of the effect, information on a sensory type of the effect, and information on duration of the effect.

15. The system of claim 8, wherein the attribute information on the effect of the target object is determined on the basis of one or more movements of the camera.

* * * * *